Sept. 30, 1930. C. L. STOKES ET AL 1,777,109
PNEUMATIC STEERING MECHANISM
Filed May 20, 1924 2 Sheets-Sheet 1
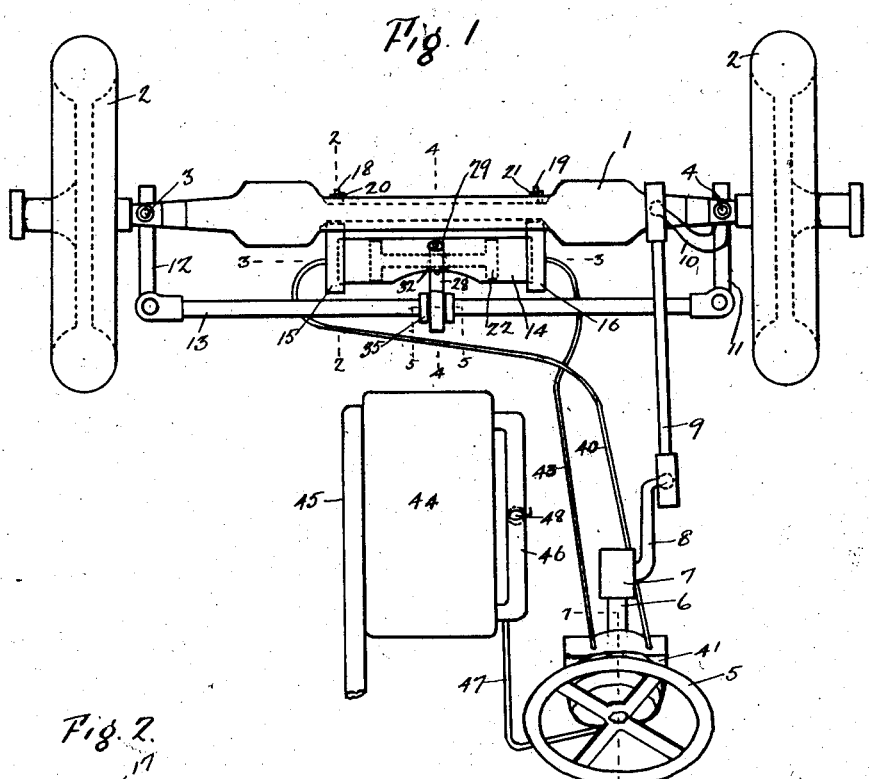
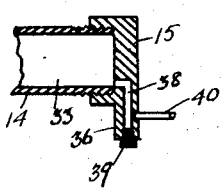
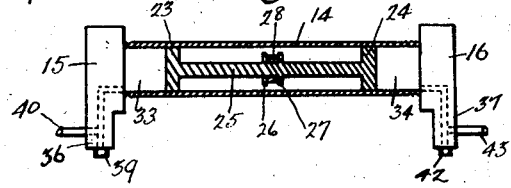
INVENTORS.
Charles L. Stokes
Charles F. Lienesch
BY
Charles L. Stokes
ATTORNEY

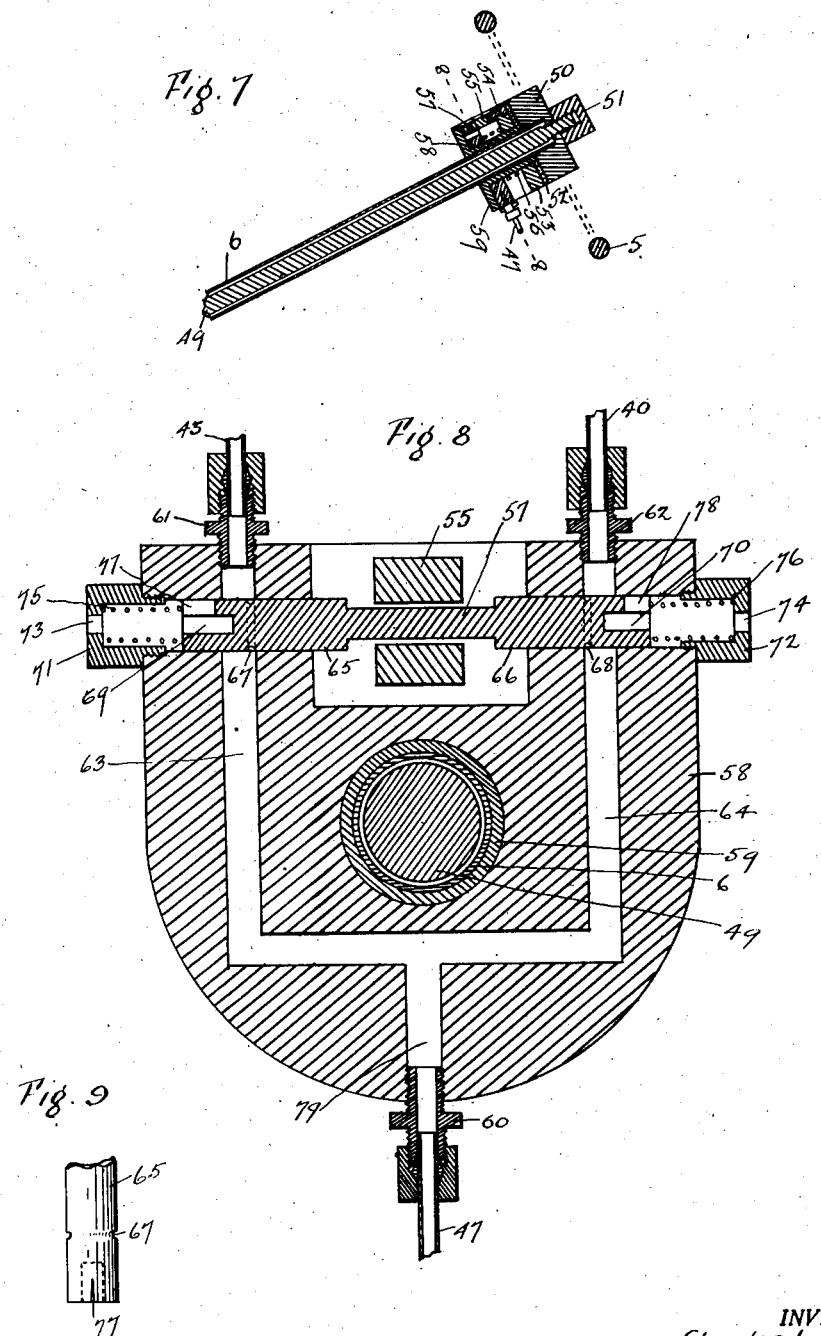

Patented Sept. 30, 1930

1,777,109

UNITED STATES PATENT OFFICE

CHARLES LAWRENCE STOKES, OF LOS ANGELES, AND CHARLES FREDRICK LIENESCH, OF LONG BEACH, CALIFORNIA

PNEUMATIC STEERING MECHANISM

Application filed May 20, 1924. Serial No. 714,602.

Our invention relates to an improved method and means for steering self-propelled vehicles.

The principal object of our invention is to utilize a fluid pressure generated by the engine in an automobile, or truck, for assisting the steering of the same.

A further object of our invention is to use the induction vacuum of an internal combustion engine for aiding the steering of a vehicle which carries the engine.

A further object of our invention is to apply our mechanism very simply to an automobile, or truck, having standard steering mechanism, whereby the vehicle may be more easily steered, or handled.

A further object of our invention is to especially utilize the fact that in all known steering mechanisms a certain amount of lost motion occurs in the same.

A further object is to provide cushioning means for absorbing road shocks applied to the steering mechanisms and for preventing the steering wheel being spun out of the driver's hands.

Other objects of our invention will become apparent as the same is more fully disclosed.

Referring to the drawings, in which the same numbers indicate like parts:

Fig. 1 is a view of our improvements attached to the front axle of a typical automobile.

Fig. 2 is a section along the lines 2—2 of Fig. 1.

Fig. 3 is a section along part of the lines indicated by 3—3 in Fig. 1.

Fig. 4 is a section along the lines 4—4 of Fig. 1.

Fig. 5 is a section along the lines 5—5 of Fig. 1.

Fig. 6 is a vertical view, partly in section, along the lines 3—3 of Fig. 1.

Fig. 7 is a sectional view along the lines 7—7 of Fig. 1.

Fig. 8 is a section along the lines 8—8 of Fig. 7.

Fig. 9 is a view of part of Fig. 8.

In present day automotive practice, it is customary to steer an automobile, or truck, by having the front wheels pivoted to turn in a substantially horizontal plane, and suitably connected together, partly by a tie-rod which tie-rod is connected by a linkage to the steering wheel, to the end that when the front wheels are turned in either direction, they shall turn approximately on the parallel curves when the vehicle is moving.

Owing to a great many different factors, it is very difficult to turn many makes of automobiles, and other four-wheel vehicles especially motor driven trucks so that, in order to make turning easy, it is customary to provide such a low gear ratio in the steering mechanism that it is often necessary to have to turn the steering wheel through 360° and more, in order to complete a 60° turn with the front wheels.

In this manner, it is extremely hard to turn such vehicles quickly owing to the fact that the manipulation of the steering wheel causes a lag in turning. However, in many cases, it is absolutely necessary to have this lag in turning, due to the gear ratio provided in the steering mechanism, because otherwise with a higher gear ratio, the vehicle could not conveniently be turned at all when moving at a slow rate of speed, or when it is desired to turn the wheels when the vehicle is still, as for instance getting in and out of a narrow space alongside the street curbing.

In general, it may be stated that all self-propelled four-wheel vehicles steer hard when the vehicle is still, or moving at a slow rate of speed, and in general that the facility of steering a vehicle increases with the vehicle speed.

We take advantage of these facts in utilizing a fluid pressure generated by the engine which pressure, in general, decreases with the speed of the vehicle, to the end that the fluid pressure is greatest when the vehicle is still, or moving slowly, when there is the greatest need for the maximum fluid pressure and the pressure automatically decreases as the vehicle speed increases and there is, in consequence, less need of a maximum fluid pressure.

Our preferred method of obtaining a fluid pressure from the internal combustion engine in an automobile, is to utilize the engine induction vacuum, which decreases, in general, with the speed of the vehicle containing the engine, but we do not limit ourselves to the use of vacuum, but prefer the same because it is the most readily available source of fluid pressure in all internal combustion engines used in automobiles, or trucks. In cases of large vehicles carrying an auxiliary pneumatic pressure drum for operating brakes, etc., we may just as easily utilize a positive pressure therefrom as the preferred method of utilizing a negative pressure derived from the engine, but in both cases it is an air pressure, or difference in pressure, which we especially use and claim. Other fluid pressures may also be used, for instance the pressure from the engine oil pump, or auxiliary fluid pressure generated by other means in the engine, such as the engine compression pressure, etc., but all such means are readily apparent to those skilled in the art and we confine ourselves herein to the description of the preferred form to be described, solely for the sake of brevity.

An automobile, or truck, is provided with a front axle 1, on each end of which is suitably pivoted a wheel 2 and, inasmuch as a conventional front axle and wheels are described, it will be sufficient to state that the wheel spindles are pivoted at 3 and 4.

The conventional steering mechanism for turning wheels 2 in either direction includes a steering wheel 5 connected by a steering column 6 to a gear case 7 wherein the motion of the wheel 5 is reduced through gearing to actuate a steering arm 8 connected through a drag link 9 to a steering knuckle thrust arm 10 which is joined to the steering knuckle for actuating the steering knuckle arm 11. A second steering knuckle arm 12 is provided and 11 and 12 are joined by a tie-rod 13 to the end that a predetermined movement of wheel 5 will simultaneously impart to the wheels 2 a predetermined angularity, thereby causing said wheels to run on substantially parallel curves.

The steering mechanism thus described is quite conventional and many forms of steering knuckle arms and gear reduction cases are known in the art, but our invention is easily applicable to all, the type illustrated showing no novelty except as to our improvements attached thereto.

Centrally located of 1 is a cylinder 14 fastened at each end into caps 15 and 16, and 15 and 16 are made, as illustrated in Fig. 2, with a lug 17 adapted to fit closely in the depression in 1, which is generally of I beam cross-section. Caps 15 and 16 are held firmly with respect to 1 by studs 18 and 19 extending through 1 and held thereon by lock nuts 20 and 21. Inasmuch as 15 and 16 are of like construction, though reversed in form, the cross-section shown in Fig. 2 is illustrative of both 15 and 16, and the same may also be held firmly on 1 by suitable straps, or clamps in any well-known manner.

Internally of 14 is placed a fitting 22 comprising piston heads 23 and 24 connected by a rod 25 having thereon flanges 26 and 27 between which is bolted a split yoke arm 28 comprising an upper and lower half suitably clamped between 26 and 27 and in close relation thereto. A hole 29 is provided in one part of 14 for gaining access to the clamp bolt 30 adapted to hold the halves of the split half yoke together.

A part of 14 to the rear of 1, is cut away at 32 to permit longitudinal motion of 28 for a predetermined distance. The pistons 23 and 24 may be of any well known design for the purpose of holding the chambers 33 and 34 in 14 substantially air tight.

The outer end of 28 partly encircles the tie-rod 13 at a certain point and the motion derived from the movement of 28 is transmitted to 13 by means of a spool 35 which is slipped in position over 13 and suitably held thereon by welding, or otherwise. In this manner the ends of 28 are maintained in a predetermined position with respect to 13, due allowance being made by suitable lost motion for the movement of tie-rod 13 to and from 1 when the wheels 2 are being turned any particular, or maximum, distance.

On the lower parts of 15 and 16 are provided extensions 36 and 37 respectively, 36 containing a passage 38 connected at one end to the interior of 14, the other end being closed by a drain plug 39. A pipe 40 connects the interior of 14 through 38 with a control apparatus 41 suitably anchored on 6, which is actuated by the wheel 5.

The construction of 16 is similar to the construction of 15 as already described and illustrated in Fig. 3 therefore it will not be necessary to state further than that the extension 37 contains a passage leading to the interior of 14, which passage is closed at one end by a plug 42 and is also connected by a pipe 43 to the control apparatus 41.

An internal combustion engine 44 is diagrammatically shown, and the same may be considered to be a typical four cylinder four cycle type in common use, having an exhaust pipe 45 and an inlet manifold 46, the inlet end of 46 being joined to any conventional carburetor for supplying liquid fuel and air in accordance with the suction induced by engine 44, said liquid fuel and air being controlled by a throttle 48.

At a suitable point in 46, and between the carburetor and the engine where a high vacuum is maintained under closed throttle conditions, a pipe 47 is led to one part of the control 41.

A form of control system suitable for operating our improvements is shown in Figs. 7, 8, and 9, wherein the steering column comprises a housing 6 through which passes the steering rod 49. The hub 50 of the steering wheel 5 surrounds the housing 6 and is clamped thereon in a well known manner by a lock nut 51 threaded on the end of 49 so that wheel 5 together with the steering rod 49 may be freely revolved.

While the hub 50, as shown, is enlarged to form a disc, it is understood it may be otherwise.

In assembling the control 41, lock nut 51 and wheel 5 are removed and a shouldered collar 59 is slipped on the housing 6 and firmly held thereon in a predetermined position. A control disc 58 is then put in place over 59 and a spring 56 is then also slipped over 59. An actuating disc 53 is then placed over 59, the outer surface of which receives a leather washer 52 for forming a friction clutch between 53 and the base of 50 which, being put in position, is securely held by the replacement of lock nut 51.

The control disc 58 is suitably bored to receive a compression fitting 60 to which the pipe 47 is fastened by a compression coupling and leads into a passage 79, divided into two passages 63 and 64 the ends of which are connected through couplings 61 and 62 respectively to the pipes 43 and 40 respectively leading to the cylinder 14, pipes 43 and 40 being held in 61 and 62 respectively by any well known form of compression coupling.

A reciprocating control valve 57 is provided which has a square central portion and terminates at one end in a cylindrical piston valve 65 for opening and closing the passage 63 and at the other end in a cylindrical piston valve 66 for opening or closing the passage 64. 57 is moved in either direction by a split dowel pin 55 which is forked at one end to partly surround the square shank 57. The other end of 55 is shouldered to butt against the actuating disc 53 being held therein by a set screw 54 which allows free circular motion of 55 around its longitudinal axis.

A groove 67 is provided in 65 for permitting the passage of a fluid from 47 to 43 and a groove 68 is provided in 66 for permitting passage of a fluid from 47 to 40, or vice versa in each case. The pistons 65 and 66 reciprocate in passages drilled in 58, the passage containing 65 being closed at one end by a nut 71 containing a compression spring 75 and the passage containing 66 being closed by a nut 72 containing a compression spring 76. 71 is drilled at 73 for the admission of atmosphere to a cored out passage 69 in 65, whence atmosphere may be admitted to 43 through a slit 77. 72 is drilled at 74 to admit atmosphere to a cored out passage 70 in 66 whence it is admitted to 40 through a slit 78.

The compression springs 75 and 76 are provided for equal compression, to the end that the piston valves 65 and 66 may maintain a predetermined central position when not exposed to any external force, such as that applied by the dowel pin 55. In other words, 65 and 66 are normally balanced. By this means, when in a central position, the grooves 67 and 68 will always permit suction through the pipe 47 and both of the pipes 43 and 40 will exclude the passage of atmosphere from 73 to 43 and from 74 to 40.

We have before mentioned that we find it highly desirable to utilize the lost motion inherent in the ordinary steering mechanism, or which may be especially provided therein, and the effect thereof will be noted in the description for operating our control and steering and auxiliary steering mechanisms in the operations now described as follows:

In the constructions noted and described for Figs. 7, 8, and 9, it will be apparent that the spring 56 will press the actuating disc 53 against the leather washer 52 and thus against the hub 50. In this manner a clutch is formed whereby when 50 is revolved the spring pressed leather disc causes a certain amount of rotation of the actuating disc 53, whereupon the dowel pin 55 is moved in one direction or another to engage the shoulders on 65 or 66 for moving the same a certain distance.

If it is assumed that the vehicle to which 1 is attached is about to be turned to the left, wheel 5 will be turned to the left. If the turn to be made is very small, it will be noted that the lost motion in the gear case 7, and other parts of the steering linkage, is suitably utilized to delay the conjunction of 55 with the shoulders on 65 and therefore it is so arranged that on very slight turns, the piston valves 65 and 66 may not be moved at all.

If it is also assumed that engine vacuum is being applied through 47, 63, 64, 67, 68, 43, and 40, to the chambers 33 and 34, it will be apparent that equal pressures exist in 33 and 34. If, now, it is desired to turn the wheels 2 sharply to the left, the wheel 5 is turned sharply over, whereupon the lost motion between 55 and 65 is eliminated and 65 is moved to the right a predetermined distance so that 55 comes in conjunction with the wall of 58. In this manner the groove 67 will have moved to continuously apply vacuum through 43 to 34, but the groove 68 will have been shrouded and the air slit 78 will have come in register with the pipe 40 to admit atmosphere to the chamber 33. As soon as this is done, the difference in pressures between 34 and 33 will become effective to move the fitting 22 and thus cause 28 to place a predetermined pressure on the tie-rod 13 for moving the wheels 2. When a predetermined movement of 2 has occurred, it is a natural course for a driver to straighten the wheels up, whereupon a reversal of 5 is made which brings 55 in conjunction with the shoulders on 66 to cut off atmosphere from 33 and apply vacuum again thereto, it being noted that the movement of 58 is limited and prescribed according to its construction for applying engine vacuum, or air, to 34 or 33, and thereafter, due to the slipping of the actuating disc, the control disc 58 will stand still with respect to the further movement of 5 and simply applies the vacuum as aforesaid for easing off the torque necessary to manually turn the wheels 2 in either direction.

In this manner, depending on the diameter of 14 and the degree of vacuum, or pressure, applied thereto, the manual effort required to steer an automobile, or truck, is cut to a minimum, so that the torque applied through 5 can be reduced to that necessary for overcoming the resistance offered by the gears in gear case 7. Such gears are usually of the so called irreversible type and where they are of that type, it will be apparent that the road shocks which are imparted to the wheels 2 and cause a horizontal oscillating motion thereof, may be controlled by the shock absorbing qualities of 14 inasmuch as the average normal movement of 22 is about 5 inches.

Such shocks being absorbed in 14, it becomes apparent that there is no danger of the wheel 5 being torn from the driver's hands, whether the gears contained in the gear case 7 are of the so called irreversible type or not.

The cylinder 14 is particularly useful as a shock absorber for preventing horizontal oscillation of the wheels 2, where air under pressure is used in place of vacuum for assisting the steering of a vehicle. It is apparent that if the pipe 47 is connected to a source of air under pressure, such as is readily available on vehicles using air brakes, etc., the spaces 33 and 34 may be held under an equalized and predetermined positive pressure.

Like differences of pressure between 33 and 34, as already described, are caused by turning the wheel 5 to the left, or right, except that with the use of positive air pressure under such circumstances, the positions of pipes 43 and 40 with respect to 34 and 33 should now be reversed, that is to say 43 should be connected to 33, and 40 connected to 34.

If then it is desired to turn wheels 2 to the left, steering wheel 5 will be turned to the left, whereupon groove 68 will be shrouded and slit 78 will open 34 to atmosphere. Atmospheric pressure will then prevail in 34, due to the escape of air under pressure through 43, 78 and 74, and 22 will be forced to the right thus aiding the steering wheel 5 to turn wheels 2 to the left.

The slits 77 and 78 are constructed in tapered form for the purpose of relieving the vacuum, or pressure in 33 and 34 gradually according to the rapidity of movement of wheel 5. For instance, when 5 is turned quickly, quick action is desired in 14 and consequently the fullest opening of 77 or 78 is presented for creating the largest possible difference in pressure between 33 and 34. On the other hand, where a quick response of 14 is not desired, or necessary, a slight movement of 5 will present but an attenuated portion of 77 or 78 for creating a slight difference in pressures between 33 and 34. It should be here noted that slit 78 does not function until groove 68 is fully shrouded. In this manner the pistons 66 and 65 act only in a positive manner for creating a difference of pressures in 34 and 33.

The utility of the lost motion is especially apparent when it is considered that a neutral position of 5 is necessary for operating a vehicle along a straight line, and we provide for this by allowing such space as may be necessary for the purpose between 55 and the shoulders on 65 and 66, in which case when 55 is centrally placed, 65 and 66 will become centrally placed also by the balanced springs 75 and 76, whereupon equal pressures will prevail in 33 and 34.

When our invention is used in connection with engine vacuum as described, it is necessary to provide for keeping the spaces 33 and 34 clear of the liquid fuel condensate drawn therein, responsive to alternations of high and low vacuum, and with positive air pressure to keep 33 and 34 clear of water condensed from the air under pressure. To this end we place the fluid passages in 15 and 16 at such a low level, that liquid condensate will run therein by gravity and the same may be drawn therefrom through plugs 39 and 42.

In place of 39 and 42 liquid traps may be inserted in 36 and 37, but such are not necessary except when positive air pressure is being used and water drawn therefrom, because when engine vacuum is being used, the alternations of high and low vacuum occurring during the operation of an automobile, or truck, engine will cause liquid fuel collected in 33 or 34 to be drawn to the engine and utilized therein.

It is to be understood that we do not limit ourselves to maintaining either a positive, or a negative pressure in 33 or 34. The same results may be obtained by maintaining 33 and 34 under atmospheric pressure and applying when desired, a positive or a negative pressure to one or the other as action warrants. We prefer, however, to maintain a positive, or a negative pressure in 33 and 34 for the reason that, inasmuch as grooves 67 and 68 are very small, the preferred pressure is readily available to assist in steering a vehicle, or in other words a minimum time is lost in evacuating or filling 33 or 34.

Many alternatives or equivalents are apparent to those skilled in the art, but such comes within the scope of the appended claims wherein we claim:—

1. In an automobile provided with dirigible wheels, a conventional steering column, a steering post therein, a steering wheel on the upper end of said post, steering mechanism between said steering wheel and said dirigible wheels for guiding said wheels, the connection between said steering wheel and said dirigible wheels having a loose motion movement, power operated mechanism including a piston member and a cylinder member, one of said members being connected to said steering mechanism direct and operated directly by the suction of the engine for assisting in steering said dirigible wheels, and means including a valve and mechanism for operating the same mounted on the upper end of said column in frictional contact with said wheel, controlled by the movement of said steering wheel in taking up said loose motion for controlling the operation of said power operated mechanism.

2. In combination, a pair of dirigible wheels, the conventional steering mechanism for guiding said wheels, said mechanism comprising a steering post, a steering arm, a steering wheel on said post, geared mechanism between said post and arm for oscillating said arm upon the rotation of said wheel, a loose motion movement in said mechanism for permitting a limited oscillation of said post in either direction independently of said arm, power operated mechanism for operating said steering mechanism, and means frictionally engaging the steering wheel and operated by the limited free movement of said wheel and post for controlling the operation of said power operated mechanism.

3. In combination, a pair of dirigible wheels, the conventional steering mechanism for guiding said wheels, said mechanism comprising a steering post, a steering wheel for rotating said post, a steering arm, cooperating mechanism between said post and arm for operating said arm from said post, a loose motion movement in said mechanism whereby said post will have a limited free turning movement in either direction independently of said arm, power operated means for operating said arm, and means frictionally operated by said free turning movement of said post for controlling the operation of said last named means.

4. In a steering gear, the combination of a steering wheel with a steering shaft, a steered part, a fluid controlling device mechanically connected to the steered part and including two valves and a shoe carried by the shaft, said shoe operating, when the steering wheel is turned in one direction, to engage with and open one of said valves, and operating, when the steering wheel is turned in the other direction, to engage and open the other of said valves, and fluid pressure apparatus connected with the steered part to operate the same by power and controlled by the said valves.

5. In a vehicle propelled by an internal combustion engine, the combination with a pair of dirigible wheels, of manually operated conventional steering mechanism therefor, said mechanism including a steering column, a steering post within said column, and a steering wheel permanently connected to said post, said mechanism having a loose motion connection therein, a linkage connecting the steering mechanism and dirigible wheels, a pneumatically operated member, means for directly connecting said member to said steering mechanism, and means frictionally engaging the steering wheel for controlling the operation of said member by the operation of said steering wheel in taking up said lost motion.

6. In a steering gear, the combination of a hand-operated steering member, a suction operated device mechanically connected directly to the steering member and steered part, and including a controlling device provided with valve means having a plurality of ports, a frictional connection between the hand operated steering member and the fluid controlling device, operating when moved in one direction to open one of said ports, and when moved in the other direction to open another of said ports, and fluid pressure apparatus connected with the steered part to operate the same by power and controlled by the said valves.

7. In a motor vehicle having a front axle and dirigible wheels thereon, means for steering said wheels, said means comprising steering mechanism, a steering column, a steering post having a loose motion connection with said mechanism, a steering wheel on the upper end of said post, a cylinder rigidly connected to said axle, a piston within said cylinder and adapted to be operated by pneumatic pressure, means for connecting said cylinder to said mechanism for operating the same, a control device including valve mechanism mounted on said column adjacent to said wheel, operated by said loose motion connection for controlling the application of pneumatic pressure to said piston for operating the same.

8. In a vehicle having a prime mover and dirigible wheels therefor, manually operated means for steering said wheels, said means comprising steering mechanism and a steering wheel having a lost motion connection with said mechanism, means operated by fluid pressure caused by the operation of said prime mover and engaging a portion of said mechanism for cooperating with said steering mechanism for steering said vehicle, said last-named means frictionally engaging said steering wheel and operated by the rotation thereof in taking up said lost motion for controlling the operation of said first-named means.

9. In a steering gear, the combination of a conventional hand operated steering member, a device mechanically connected to the steered part and operated by the suction of the engine for assisting in operating said steering gear, mechanism for controlling the application of suction to said device, a yielding connection between the hand operated steering member and said mechanism, said mechanism including valve means having a plurality of ports, said mechanism operating to open one of said ports when said steering member is moved in one direction and operating to open another of said ports when the steering member is moved in another direction to control the application of the engine suction and a resilient member at each end of said valve means for normally positioning the same.

10. In a steering gear, the combination of conventional hand operated steering means including steering mechanism, a steering wheel having a loose motion connection with said mechanism, a suction operated device mechanically connected directly to the steered part and steering mechanism, control mechanism for said device comprising valve means having a pair of ports, one of said ports when open operating to effect steering in one direction and the other port operating when open to effect steering in the other direction, a valve actuating member yieldably connected to and operated by the hand operated steering wheel for controlling the movement of said valve means through said lost motion connection, resilient means for normally positioning said valve means, and means actuated by the fluid pressure connected with the steered part to operate the same.

Signed at Wilmington, in the county of Los Angeles and State of California, this 14th day of May, A. D. 1924.

CHARLES LAWRENCE STOKES.
CHARLES FREDRICK LIENESCH.